United States Patent [19]
Saito et al.

Patent No.: US 6,668,798 B2
Date of Patent: Dec. 30, 2003

(54) APPARATUS FOR CONTROLLING IGNITION TIMING OF ENGINE

(75) Inventors: Shinji Saito, Saitama (JP); Masaya Adachi, Saitama (JP); Norimasa Hattori, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 150 days.

(21) Appl. No.: 10/040,640

(22) Filed: Jan. 9, 2002

(65) Prior Publication Data

US 2002/0092497 A1 Jul. 18, 2002

(30) Foreign Application Priority Data

Jan. 9, 2001 (JP) ........................................ 2001-001295

(51) Int. Cl.$^7$ .................................................. F02P 5/15
(52) U.S. Cl. .............................. 123/406.5; 123/406.52; 123/406.59
(58) Field of Search .................... 123/406.25, 406.5, 123/406.52, 406.55, 406.59

(56) References Cited

U.S. PATENT DOCUMENTS

| | | | | |
|---|---|---|---|---|
| 3,353,524 A | * | 11/1967 | Sarto | 123/406.5 X |
| 3,677,238 A | * | 7/1972 | Harada et al. | 123/406.69 |
| 4,503,822 A | * | 3/1985 | Kobayashi et al. | 123/406.52 X |
| 4,543,634 A | * | 9/1985 | Kobayashi et al. | 123/406.52 X |
| 5,056,496 A | * | 10/1991 | Morino et al. | 123/604 |
| 5,579,736 A | * | 12/1996 | Nakamura et al. | 123/406.5 X |
| 5,934,247 A | * | 8/1999 | Hashimoto et al. | 123/406.5 X |

FOREIGN PATENT DOCUMENTS

| | | | | |
|---|---|---|---|---|
| JP | 159771 A | * | 7/1987 | ............ 123/406.66 |
| JP | 2646216 | | 5/1997 | |

* cited by examiner

Primary Examiner—Tony M. Argenbright
(74) Attorney, Agent, or Firm—Birch, Stewart, Kolasch & Birch, LLP

(57) ABSTRACT

An apparatus for controlling an ignition timing of an engine is capable of reducing or preventing occurrences of backfires. The apparatus includes a no-load deceleration state detector for detecting that an engine is in a no-load deceleration state. An engine speed detector detects an engine speed. An advanced timing setting unit sets an advanced ignition timing (retard amount) in situations where the occurrence of backfires are likely, such as during the no-load deceleration state. A converter 105 determines an ignition angle $\theta_{ig}$ on the basis of an output pulse of a pulse generator and an advance amount provided by the advanced ignition timing setting unit.

20 Claims, 2 Drawing Sheets

APPARATUS FOR CONTROLLING IGNITION TIMING OF ENGINE

BACKGROUND OF THE INVENTION

1. Field of the Invention

The present invention relates to an apparatus for controlling an ignition timing of an engine. More particularly, the present invention relates to an apparatus for controlling an ignition timing of an engine, which is capable of reducing the likelihood of backfires.

2. Description of the Relevant Art

When engine speed is decreased sharply, the ratio of fresh air to the volume of a cylinder is lowered. Hence, a charging efficiency decreases, so that the air/fuel ratio in the cylinder becomes lean. As a result, the possibility of backfires increases, such that a flame propagating speed becomes slow and flame spreads into an intake path.

Systems are known in the background art to decrease the likelihood of backfiring. For example, Japanese Patent Bulletin No. 2,646,216 discloses an ignition timing control system. In the background art, when sudden deceleration occurs, the ignition timing control advances the ignition timing (relative to a normal ignition timing) until a throttle is fully closed.

According to the background art, the ignition timing is advanced (relative to the normal ignition timing) until the throttle is fully closed, when sudden deceleration occurs. After the throttle is fully closed, the ignition timing is reset to the standard or normal ignition timing. In other words, the ignition timing is no longer advanced.

According to experiments conducted by the inventors, backfires occur most often in a sudden deceleration state. Backfires particularly occur when the throttle is suddenly opened from a no-load deceleration state.

Based upon the inventor's experiments, it can be seen that the system of the background art has drawbacks. In the system of the background art, the ignition timing is reset from the advanced state to the normal state at the time when the throttle is fully closed. However, if the throttle is suddenly opened during a no-load deceleration state, backfires are likely to occur.

On the other hand, if the ignition timing is advanced after the throttle opening operation is detected at the time of sudden deceleration, the flame propagation speed just before the opening operation cannot be improved. When the ignition timing is advanced only on condition that the throttle is fully closed, poor engine performance results, particularly a "knocking" problem occurs.

SUMMARY OF THE INVENTION

It is an object of the present invention to solve one or more of the drawbacks associated with the systems and techniques of the background art.

It is an object of the present invention to provide an apparatus for controlling ignition timing of an engine, capable of effectively preventing backfires by a simple configuration.

These and other objects are accomplished by an apparatus for variably controlling an ignition timing of an engine in accordance with operating conditions of the engine, said apparatus comprising: a no-load deceleration state detector for detecting that an engine is in a no-load deceleration state; an engine speed detector for detecting an engine speed; and a controller advancing an ignition timing when said no-load deceleration state detector detects the no-load deceleration state and said engine speed detector detects the engine speed to be in a speed range.

Further, these and other objects are accomplished by an apparatus for variably controlling an ignition timing of an engine in accordance with operating conditions of the engine, said apparatus comprising: a standard ignition timing setting unit for providing standard ignition timing control signals during normal engine operating conditions; an advanced ignition timing setting unit for providing advanced ignition timing control signals during engine operating conditions prone to backfiring; a pulse generator sensing an angular position of a crankshaft, and outputting pulse signals; a converter for receiving the pulse signals from said pulse generator; a switch to selectively connect one of said standard ignition timing setting unit and said advanced ignition timing setting unit to said converter; and a no-load deceleration state determining unit controlling the operation of said switch, said no-load deceleration state determining unit causing said switch to connect said advanced ignition timing setting unit to said converter during engine operating conditions prone to backfiring and causing said switch to connect said standard ignition timing setting unit to said converter at other times, wherein the engine operating conditions prone to backfiring include a speed of the engine being within a predetermined speed range.

Moreover, these and other objects are accomplished by a method of controlling an ignition timing of an engine comprising the steps of: sensing if a throttle is fully closed; if the throttle is fully closed, determining an engine speed; if the engine speed is with a predetermined speed range, comparing a drop rate in the engine speed to a threshold value; and if the drop rate meets or exceeds the threshold value, advancing an ignition timing.

According to the present invention, the ignition timing is advanced at the time of sudden opening of the throttle from the no-load deceleration state, which is the time when backfires occur the most. As a result, combustion can be finished in a cylinder before an exhaust port is opened, so that the occurrence of backfires can be reduced or prevented, without deteriorating the operation of the engine, such as avoiding knocking.

According to the present invention, whether or not the engine is in the no-load deceleration state is determined on the basis of throttle angle and engine speed. Thus, a detector for detecting that the engine and the output shaft are disengaged from each other is unnecessary.

Alternatively, according to the present invention, by using the fact that the drop rate of the engine speed, at the time of no-load deceleration, is peculiar to each engine, whether or not the engine is in the no-load deceleration state can be determined on the basis of only the engine speed. Thus, a detector for detecting a throttle angle is also unnecessary.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
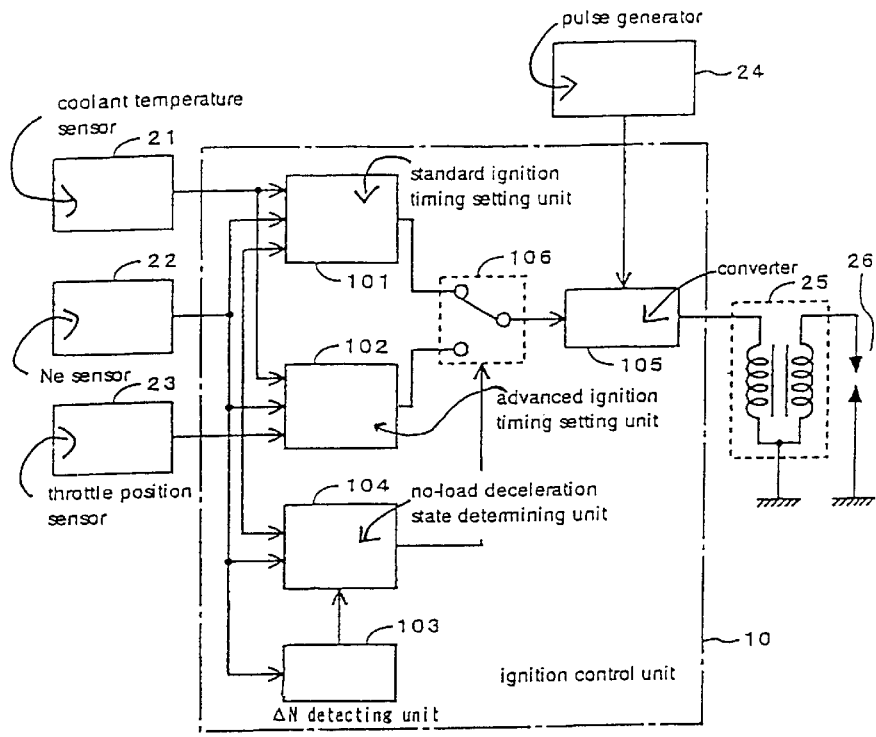
FIG. 1 is a block diagram showing a configuration of main components of an ignition timing control apparatus, in accordance with the present invention.

In FIG. 1, a coolant temperature sensor 21 senses temperature $T_{eng}$ of cooling water of the engine. A Ne sensor 22 senses an engine speed or RPM (Ne). A throttle position sensor 23 senses a throttle angle θth. A pulse generator 24 generates a pulse signal representing a crank angle of a crankshaft of the engine.

An ignition control unit 10 calculates an ignition timing on the basis of the cooling water temperature $T_{eng}$, engine speed Ne, throttle angle θth, and pulse generation timing of the pulse generator 24. The ignition control unit 10 supplies arc energy to an ignition plug 26, via an ignition coil 25.

The ignition control unit 10 includes several sub-components. A standard ignition timing setting unit 101 sets a standard ignition timing (advance amount or retard amount) on the basis of the cooling water temperature $T_{eng}$, engine speed Ne, and throttle angle θth. An advance angle timing setting unit 102 sets an advance ignition timing (retard angle). The advance ignition timing (retard angle) is set in environments where the occurrence probability of backfires is high (e.g. a no-load deceleration state). The advance timing (retard angle) is set on the basis of the cooling water temperature $T_{eng}$, engine speed Ne, and throttle angle θth. The advance amount is set to be larger than the advance amount selected by the standard ignition timing setting unit 101, in the case where the engine is not in the no-load deceleration state.

A ΔN detecting unit 103 detects a rate of change (ΔN) in engine speed. A no-load deceleration state determining unit 104 determines whether or not the engine is in the no-load deceleration state. In the no-load deceleration state, the engine and the output shaft are disengaged from each other. In other words, the no-load deceleration state determining unit 104 determines whether or not a clutch is disengaged or a gear position is neutral and whether or not the throttle is closed, on the basis of the engine speed Ne, throttle angle θth, and rate of change ΔN in engine speed.

When the engine is in the no-load deceleration state, a switching unit 106 is controlled to connect the advanced ignition timing setting unit 102 to a converter 105. When the engine is not in the no-load deceleration state, the switching unit 106 is controlled to connect the standard ignition timing setting unit 101 to the converter 105.

The converter 105 determines an ignition angle $\theta_{ig}$ on the basis of output pulses of the pulse generator 24 and the advance amount or retard amount provided by the standard ignition timing setting unit 101 or the advanced ignition timing setting unit 102. The arc energy supplied to the ignition coil 25 is interrupted at the ignition angle $\theta_{ig}$, thereby allowing the ignition plug 26 to ignite at an optimum timing.

With reference to the flowchart of FIG. 2 and the timing chart of FIG. 3, operations of the ignition control unit 10 will be described. The flowchart of FIG. 2 focuses on the processes in the no-load deceleration state determining unit 104.

In step S10, it is determined, based upon an output signal of the throttle position sensor 23, whether or not the throttle is in a fully closed state. When the throttle is not in the fully closed state, like at time t0 in FIG. 3, it is determined that the engine is not in the no-load deceleration state. When the engine is not in the no-load deceleration state, backfires are not prone to occur, and the program advances to step S13.

In step S13, the switching unit 106 is controlled so that the standard ignition timing setting unit 101 is connected to the converter 105. As a result, in the ignition control unit 10, the ignition angle $\theta_{ig}$ is calculated on the basis of the standard ignition timing set by the standard ignition timing setting unit 101 and a detection timing of the pulse signals of the pulse generator 24. Therefore, normal ignition, allowing the plug 26 to make ignition at the ignition angle $\theta_{ig}$, is executed.

When the throttle is fully closed (at time t1 in FIG. 3), the fully closed state is detected in step S10. Processing then proceeds to step S11. In step S11, it is determined whether or not the engine speed Ne detected by the Ne sensor 22 is within a predetermined control execution range. As an example, the control execution range may be set to a low speed range from an idle speed (about 1000 rpm) to 3000 rpm. Consequently, for example, at time t2, when the engine speed Ne enters the control execution range, the program advances to step S12.

In step S12, it is determined whether or not a drop rate ΔN of the engine speed Ne, obtained by the ΔN detecting unit 103, is equal to or higher than a predetermined reference drop rate $\Delta N_{ref}$. For example, the reference drop rate $\Delta N_{ref}$ may be set to 200 rpm/100 msec. When the drop rate ΔN of the engine speed Ne exceeds the reference drop rate $\Delta N_{ref}$ (see time t3 in FIG. 3), processing proceeds to step S14. In step S14, the switching unit 106 is controlled so that the advanced ignition timing setting unit 102 is connected to the converter 105.

Figure 2:
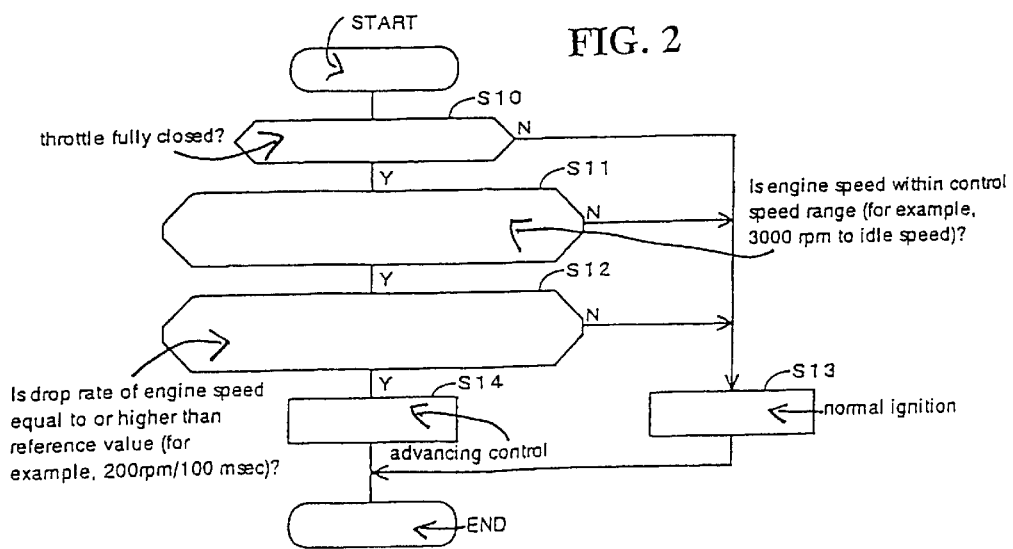
FIG. 2 is a flowchart for explaining operations of the apparatus of FIG. 1.
Figure 3:
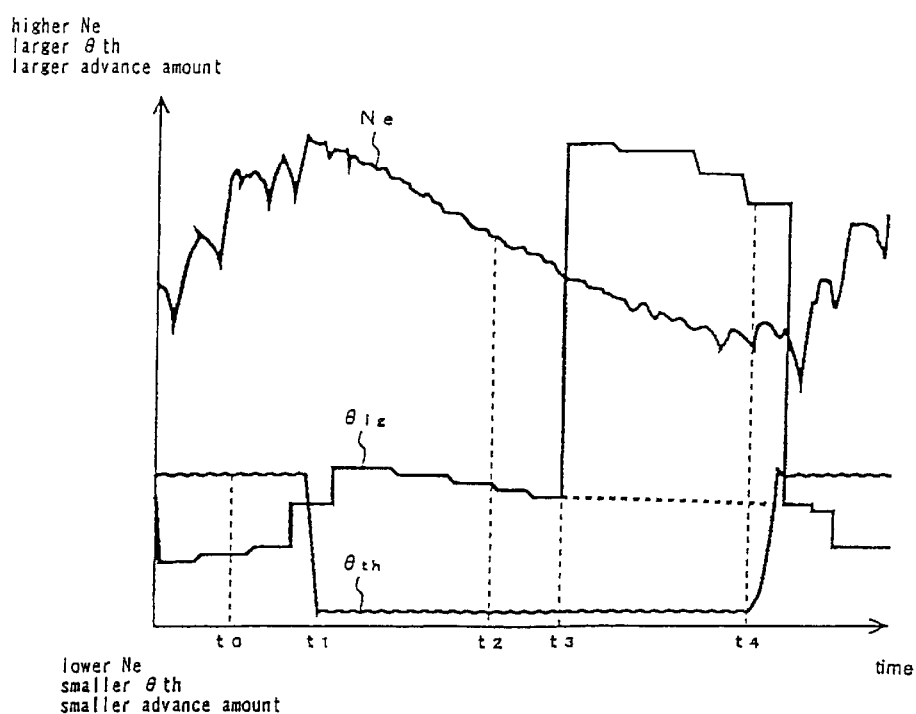
FIG. 3 is a timing chart for further explaining the operations of the apparatus of FIG. 1.

By the control method illustrated in FIG. 2, the ignition control unit 10 controls the ignition of the plug 26 to make ignition at a desirable ignition angle $\theta_{ig}$. The ignition angle $\theta_{ig}$ is calculated on the basis of the advance amount, set in the advance ignition timing setting unit 102, and the detection timing of the pulse signal, provided by the pulse generator 24.

As previously mentioned, backfires are most prone to occur during the no-load deceleration state. When the no-load deceleration state (expressed by a dotted line portion of line $\theta_{ig}$ in FIG. 3), is detected and the engine speed is in the low speed range, the ignition timing is advanced (relative to a normal ignition timing). Therefore, even when the throttle is suddenly opened from the no-load deceleration state at time t4, backfires are not prone to occur.

Whether or not the engine is in the no-load deceleration state is determined on the basis of the throttle angle and the engine speed. According to the present invention, it is not required to detect whether or not the engine and the output shaft are disengaged from each other. Consequently, a sensor for sensing that a gear is in the neutral position, a sensor for sensing that the clutch is disengaged, or similar sensors are unnecessary.

According to the results of experiments conducted by the inventors, the drop rate of the engine speed at the time of the no-load deceleration is peculiar to each engine. Whether or not the engine is in the no-load deceleration state can therefore be determined on the basis of only the drop rate of the engine speed. With such a configuration, the throttle position sensor also becomes unnecessary and may be eliminated.

The ignition control 10 has many advantages over the background art:

Since the no-load deceleration state, where backfires are most prone to occur, is detected and the ignition timing is advanced, even when the throttle is suddenly opened after that, occurrence of backfires can be effectively reduced or prevented.

Whether the engine is in the no-load deceleration state or not is determined on the basis of the throttle angle and the engine speed. By this arrangement, a sensor for sensing that the engine and the output shaft are disengaged from each other, such as a sensor for sensing that the clutch is disengaged or a gear is in the neutral position, is unnecessary.

The present invention appreciates the fact that the drop rate of the engine speed at the time of the no-load deceleration is peculiar to each engine. Whether or not the engine is in the no-load deceleration state may be determined on the basis of only the engine speed. Thus, a throttle position sensor can also be rendered unnecessary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for variably controlling an ignition timing of an engine in accordance with operating conditions of the engine, said apparatus comprising:
    a no-load deceleration state detector for detecting that an engine is in a no-load deceleration state;
    an engine speed detector for detecting an engine speed; and
    a controller advancing an ignition timing when said no-load deceleration state detector detects the no-load deceleration state and said engine speed detector detects the engine speed to be in a speed range.

2. The apparatus according to claim 1, wherein the speed range includes a lower limit of approximately 1000 rpm.

3. The apparatus according to claim 1, wherein the speed range includes an upper limit of approximately 3000 rpm.

4. The apparatus according to claim 1, wherein the speed range is between 1000 rpm and 3000 rpm.

5. The apparatus according to claim 1, wherein said no-load deceleration state detector determines that the engine is in the no-load deceleration state when a drop rate of the engine speed exceeds a threshold value.

6. The apparatus according to claim 5, wherein the threshold value is approximately 200 rpm/100 msec.

7. The apparatus according to claim 1, further comprising:
    a throttle position detector for detecting a throttle position, wherein said no-load deceleration state detector determines that the engine is in the no-load deceleration state when a drop rate of the engine speed exceeds a threshold value and the throttle position is a fully close position.

8. The apparatus according to claim 7, wherein the threshold value is approximately 200 rpm/100 msec.

9. The apparatus according to claim 7, wherein said throttle position detector is a throttle angle sensor.

10. An apparatus for variably controlling an ignition timing of an engine in accordance with operating conditions of the engine, said apparatus comprising:
    a standard ignition timing setting unit for providing standard ignition timing control signals during normal engine operating conditions;
    an advanced ignition timing setting unit for providing advanced ignition timing control signals during engine operating conditions prone to backfiring;
    a pulse generator sensing an angular position of a crankshaft, and outputting pulse signals;
    a converter for receiving the pulse signals from said pulse generator;
    a switch to selectively connect one of said standard ignition timing setting unit and said advanced ignition timing setting unit to said converter; and
    a no-load deceleration state determining unit controlling the operation of said switch, said no-load deceleration state determining unit causing said switch to connect said advanced ignition timing setting unit to said converter during engine operating conditions prone to backfiring and causing said switch to connect said standard ignition timing setting unit to said converter at other times, wherein the engine operating conditions prone to backfiring include a speed of the engine being within a predetermined speed range.

11. The apparatus according to claim 10, wherein the engine operating conditions prone to backfiring further include that a throttle is determined to be fully closed.

12. The apparatus according to claim 10, wherein the predetermined speed range is defined by an engine speed between 1000 rpm and 3000 rpm.

13. The apparatus according to claim 10, wherein the engine operating conditions prone to backfiring further include that a drop rate of the engine speed exceeds a threshold value.

14. The apparatus according to claim 13, wherein the threshold value is approximately 200 rpm/100 msec.

15. The apparatus according to claim 14, wherein the predetermined speed range is defined by an engine speed between 1000 rpm and 3000 rpm.

16. The apparatus according to claim 13, wherein the engine operating conditions prone to backfiring further include that a throttle is determined to be fully closed.

17. The apparatus according to claim 10, further comprising:
    an engine temperature sensor providing an input to said standard ignition timing setting unit and said advanced ignition timing setting unit.

18. A method of controlling an ignition timing of an engine comprising the steps of:
    sensing if a throttle is fully closed;
    if the throttle is fully closed, determining an engine speed;
    if the engine speed is with a predetermined speed range, comparing a drop rate in the engine speed to a threshold value; and
    if the drop rate meets or exceeds the threshold value, advancing an ignition timing.

19. The method according to claim 18, wherein the predetermined speed range is defined by an engine speed between 1000 rpm and 3000 rpm.

20. The method according to claim 19, wherein the threshold value is approximately 200 rpm/100 msec.

* * * * *